United States Patent
Iida et al.

(10) Patent No.: US 12,027,799 B2
(45) Date of Patent: Jul. 2, 2024

(54) ELECTRICAL JUNCTION BOX

(71) Applicant: Yazaki Corporation, Tokyo (JP)

(72) Inventors: Hiroaki Iida, Makinohara (JP); Kei Tomita, Makinohara (JP); Koji Makiyama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 400 days.

(21) Appl. No.: 17/495,059

(22) Filed: Oct. 6, 2021

(65) Prior Publication Data
US 2022/0115810 A1    Apr. 14, 2022

(30) Foreign Application Priority Data
Oct. 12, 2020 (JP) .................. 2020-172002

(51) Int. Cl.
| H01R 13/627 | (2006.01) |
| B60R 16/023 | (2006.01) |
| H01R 33/06 | (2006.01) |
| H02G 3/08 | (2006.01) |
| H01H 45/04 | (2006.01) |
| H02B 1/04 | (2006.01) |

(52) U.S. Cl.
CPC ..... H01R 13/6272 (2013.01); B60R 16/0239 (2013.01); H01R 33/06 (2013.01); H02G 3/081 (2013.01); H01H 45/04 (2013.01); H02B 1/04 (2013.01)

(58) Field of Classification Search
CPC ................ H01R 13/6272; H01R 33/06; B60R 16/0239; B60R 16/0238; H02G 3/081; H02G 3/16; H01H 45/04; H01H 2050/049; H01H 50/048; H02B 1/04
See application file for complete search history.

(56) References Cited

U.S. PATENT DOCUMENTS 9,742,116 B1 *   8/2017   Nishiyama ........... H01R 13/641
2007/0010123 A1  1/2007   Ikeda

FOREIGN PATENT DOCUMENTS

JP    2007-20357 A    1/2007
JP    2013-39019 A    2/2013

* cited by examiner

Primary Examiner — Michael C Zarroli
(74) Attorney, Agent, or Firm — Sughrue Mion, PLLC

(57) ABSTRACT

An electrical junction box includes an electronic component including a component main body and a terminal protruding from the component main body, a block including a mating terminal configured to be connected to the terminal and a block main body configured to accommodate the mating terminal and a case having a box shape and configured to accommodate the electronic component and the block. The component main body of the electronic component is provided with a first locking portion. The block is provided with a second locking portion. The case is provided with a third locking portion configured to be engaged with the first locking portion and a fourth locking portion configured to be engaged with the second locking portion.

4 Claims, 5 Drawing Sheets

ELECTRICAL JUNCTION BOX

CROSS-REFERENCE TO RELATED APPLICATION

The present application claims priority to Japanese Patent Application No. 2020-172002 filed on Oct. 12, 2020, the entire content of which is incorporated herein by reference.

TECHNICAL FIELD

The present invention relates to an electrical junction box to be attached to an engine room or the like of an automobile.

BACKGROUND

Some of electrical junction boxes of related art are mounted on a vehicle (for example, a relay box). Electronic components such as relays and fuses are mounted on the electrical junction box. Each of these electronic components includes a component main body and a terminal protruding from the component main body. The terminal of the electronic component is to be connected to a mating terminal accommodated in a block locked to the case.

In related art, the electronic component is fixed to the block only by means of the terminal connected to the mating terminal. Therefore, the fixing strength is weak and the reliability of connection between the terminal of the electronic component and the mating terminal accommodated in the block is low. Therefore, there has been proposed an electrical junction box in which a locking portion is provided in a component main body which is to be locked to a block to increase the fixing strength of an electronic component (see, for example, JP2013-39019A).

However, in the related art described above, it is necessary to provide a locking portion in the block to lock a component body, and already existing blocks in which such locking portion to lock the component main body is not provided cannot be used.

SUMMARY

Illustrative aspects of the present invention provide an electrical junction box configured to increase the fixing strength of an electronic component and in which it is possible to use existing blocks in which a locking portion to lock a component main body is not provided.

According to an illustrative aspect of the present invention, an electrical junction box includes an electronic component including a component main body and a terminal protruding from the component main body, a block including a mating terminal configured to be connected to the terminal and a block main body configured to accommodate the mating terminal and a case having a box shape and configured to accommodate the electronic component and the block. The component main body of the electronic component is provided with a first locking portion. The block is provided with a second locking portion. The case is provided with a third locking portion configured to be engaged with the first locking portion and a fourth locking portion configured to be engaged with the second locking portion.

Other aspects and advantages of the invention will be apparent from the following description, the drawings and the claims.

DESCRIPTION OF EMBODIMENTS

Specific embodiments of the present invention will be described below with reference to the drawings.

Figure 1:
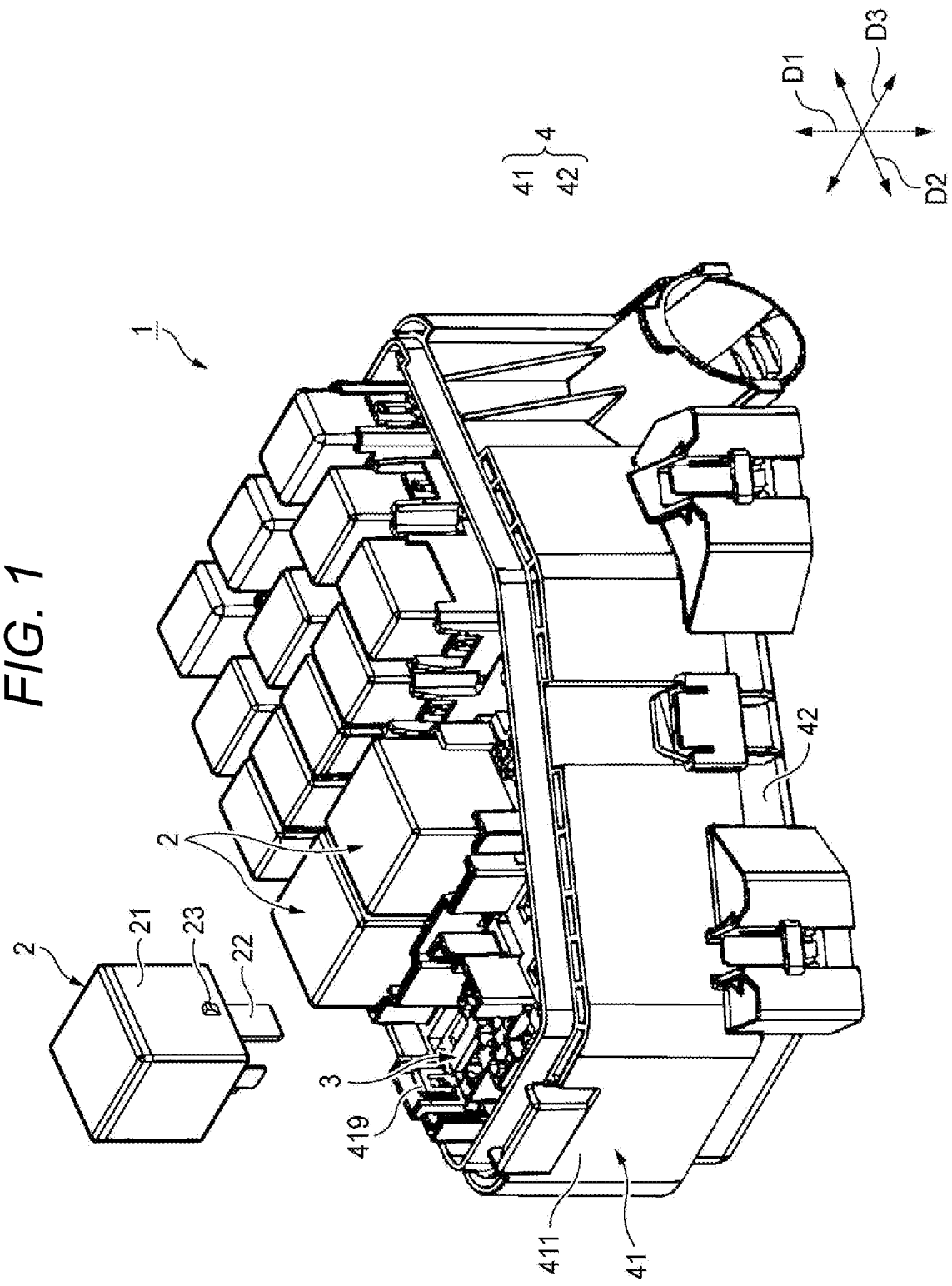
FIG. 1 is a perspective view showing an electrical junction box according to an embodiment of the present invention.
Figure 2:
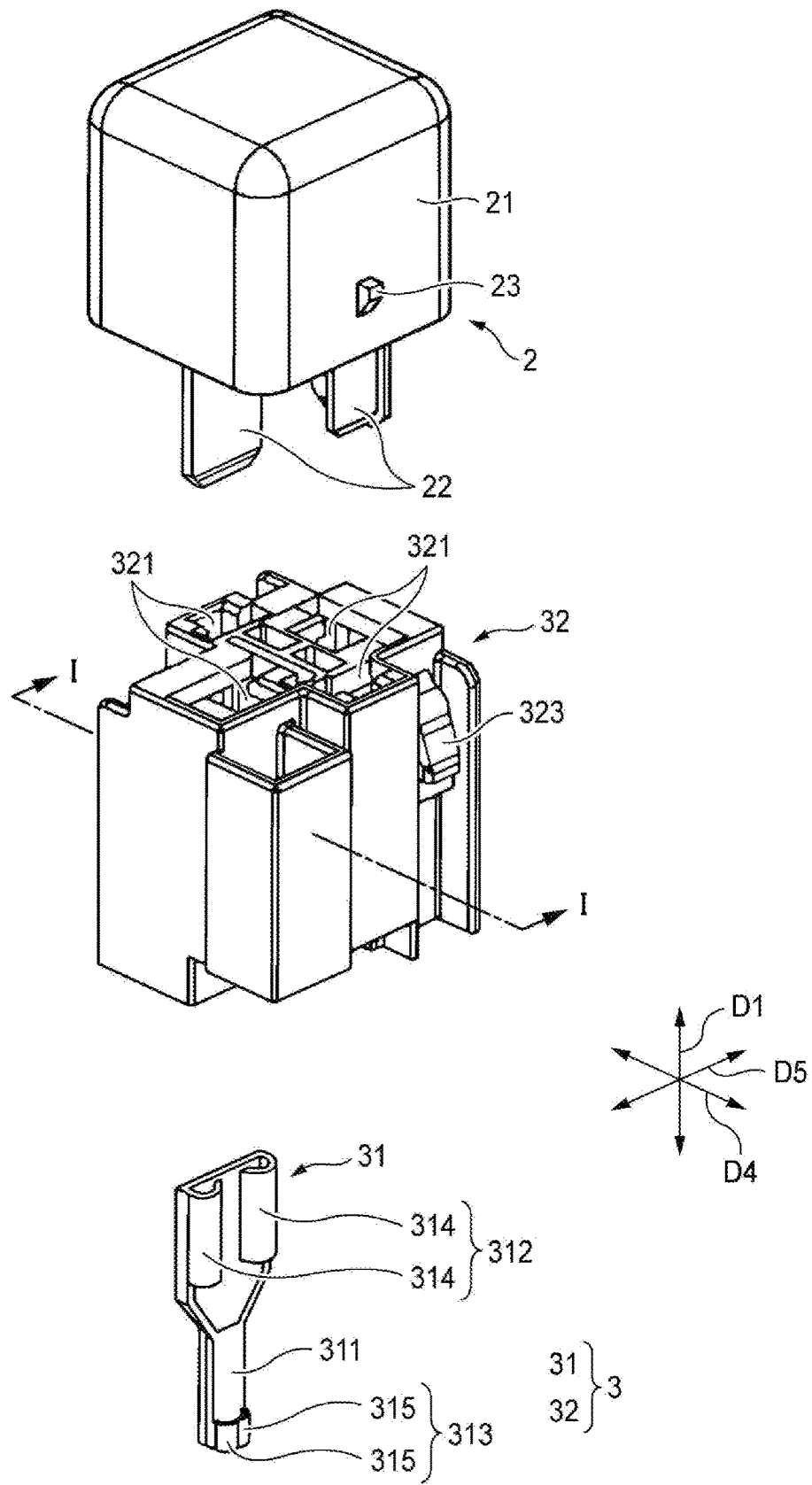
FIG. 2 is an exploded perspective view of a relay and a block forming the electrical junction box shown in FIG. 1.
Figure 3:
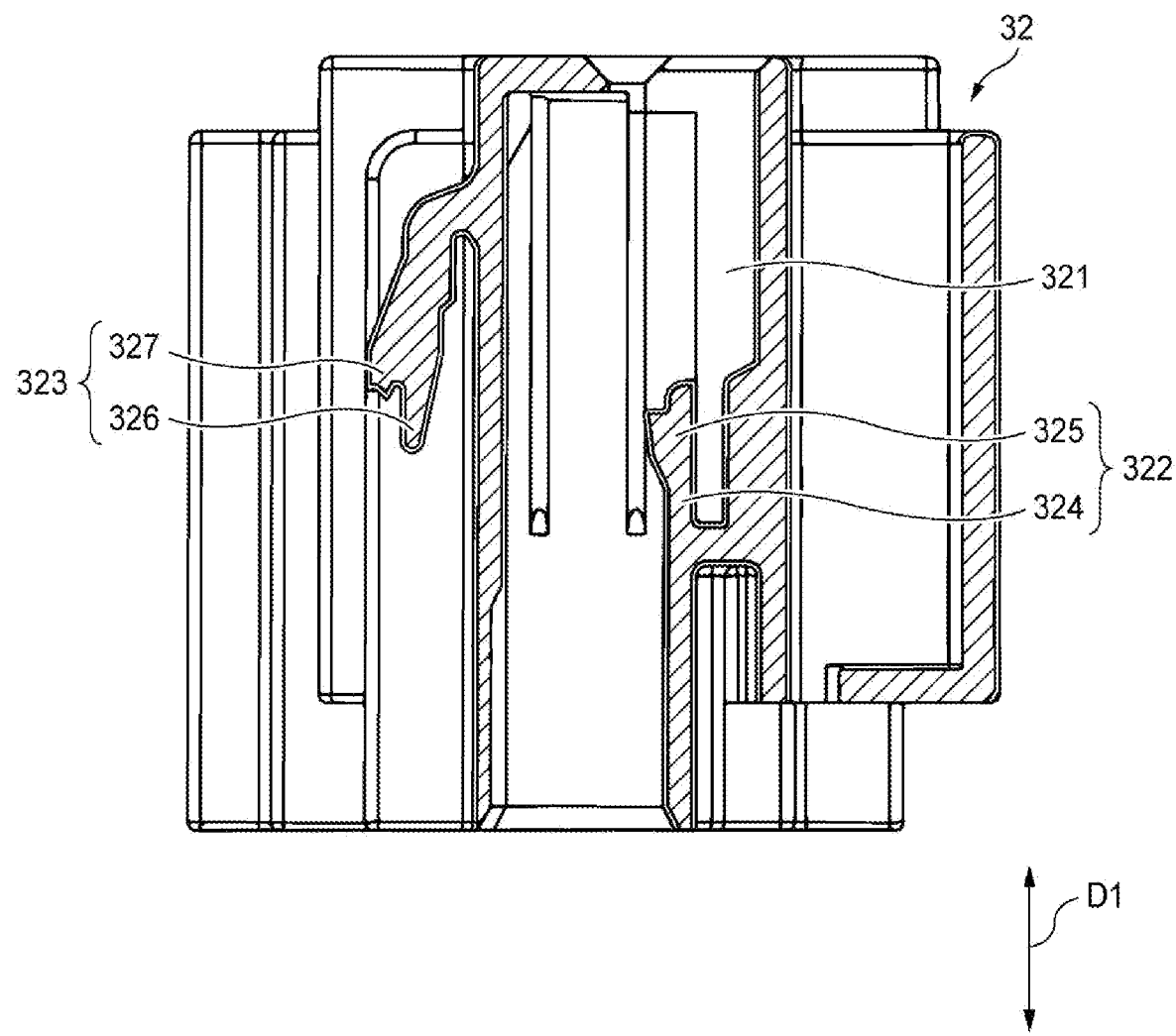
FIG. 3 is a cross-sectional view taken along a line I-I in FIG. 2.
Figure 4:
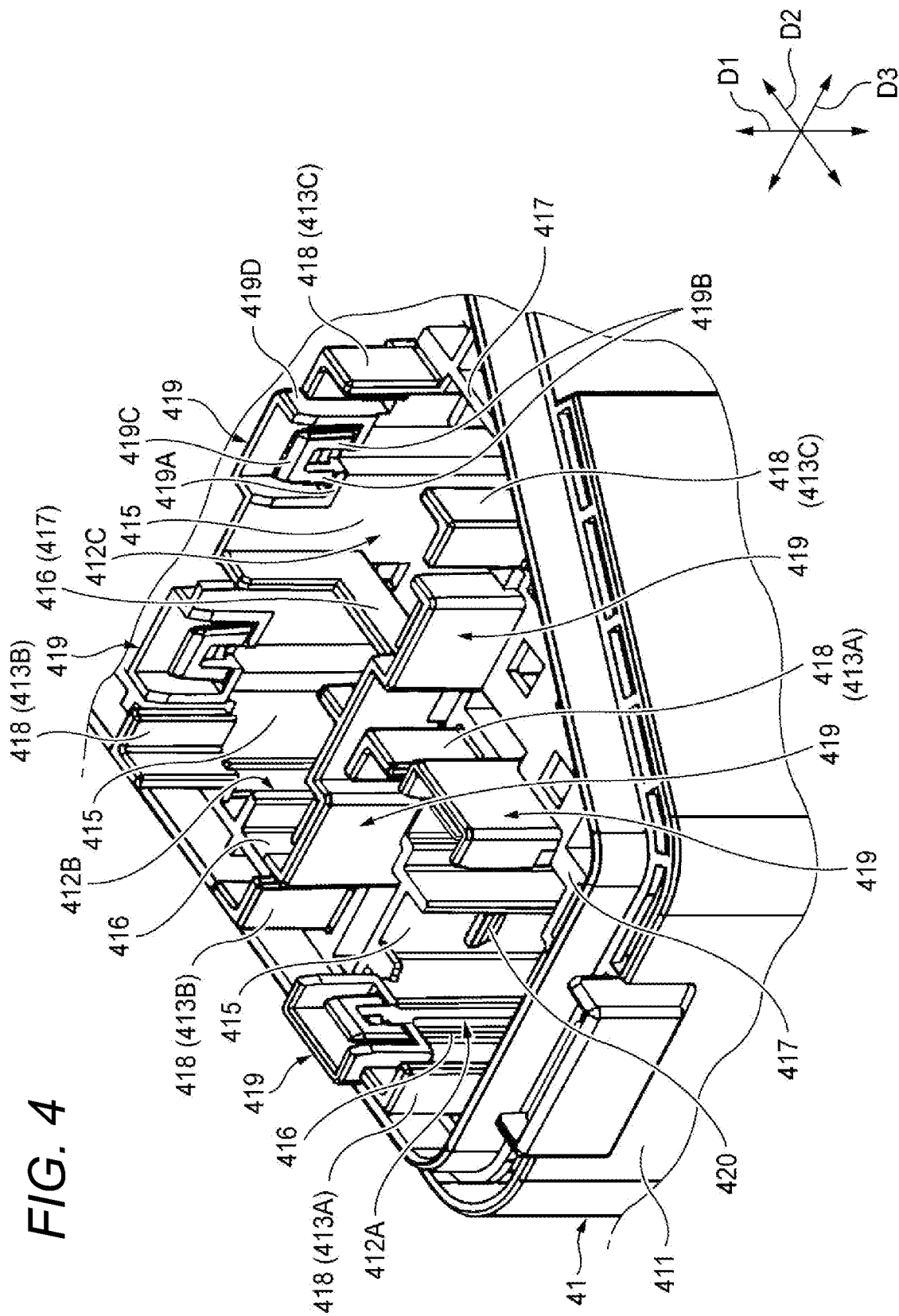
FIG. 4 is a partial perspective view of a frame shown in FIG. 1.
Figure 5:
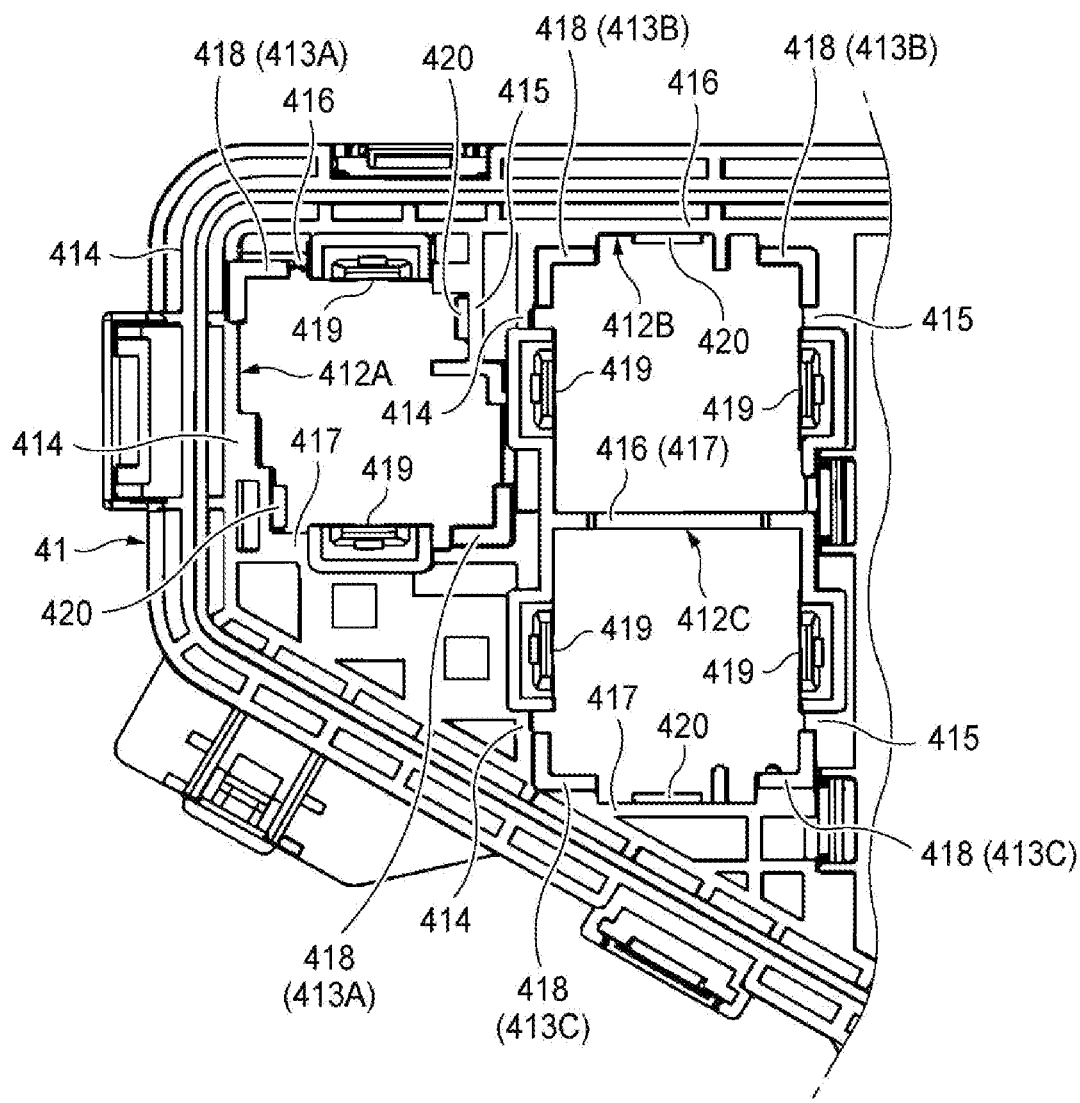
FIG. 5 is a top view of the frame shown in FIG. 1.
Figure 5:
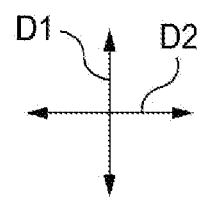

FIG. 1 is an exploded perspective view showing an electrical junction box 1 according to an embodiment of the present invention. In FIG. 1, an upper cover is omitted. FIG. 2 is an exploded perspective view of a relay 2 and a block 3 forming the electrical junction box 1 shown in FIG. 1. FIG. 3 is a cross-sectional view taken along a line I-I in FIG. 2. FIG. 4 is a partial perspective view of a frame shown in FIG. 1. FIG. 5 is a top view of the frame shown in FIG. 1.

The electrical junction box 1 according to the present embodiment is to be basically mounted on a vehicle and to accommodate electronic components such as relays and fuses.

As shown mainly in FIG. 1, the electrical junction box 1 includes a plurality of relays (electronic components) 2, a plurality of blocks 3 in which mating terminals 31 to be connected to the relays 2 are accommodated, and a case 4 in which the relays 2 and the blocks 3 are to be accommodated.

Hereinafter, for convenience of explanation, an "upper-lower direction D1", a "longitudinal direction D2", and a "lateral direction D3" are defined as shown in FIG. 1 and in other Figures. The "upper-lower direction D1", the "longitudinal direction D2", and the "lateral direction D3" are orthogonal to one another. When the electrical junction box 1 is mounted on a vehicle, the "upper-lower direction D1" corresponds to an upper-lower direction D1 of the vehicle. The case 4 is provided in a substantially rectangular shape when viewed from above. The "longitudinal direction D2" corresponds to a longitudinal direction of the rectangular case 4. The "lateral direction D3" corresponds to the lateral direction of the rectangular case 4.

As shown in FIG. 1, the relays 2 (electronic components) are arranged in a matrix form along the longitudinal direction D2 and the lateral direction D3 in the case 4. As shown in FIG. 2, the relay 2 includes a relay main body 21 (component main body) and a plurality of terminals 22 protruding from the relay main body 21. The relay 2 is to be accommodated in the case 4 with a protruding direction in which the terminal 22 protrudes from the relay main body 21 oriented downward in the upper-lower direction, i.e., the protruding direction corresponds to a lower direction or a lower side in the upper-lower direction. The relay main body 21 is formed in a cubic shape, and a plurality of plate-shaped terminals 22 protrude from one surface of the relay main body 21. The relay main body 21 is provided with a pair of first locking portions 23, 23 that are to be engaged with the case 4. Each of the pair of first locking portions 23, 23 is formed of a locking projection whose projecting amount decreases toward the lower side in the upper-lower direction D1.

In the present embodiment, the relay 2 in the leftmost row in FIG. 1 is accommodated in the case 4 such that the protruding direction of the locking projections forming the first locking portions 23, 23 is along the lateral direction D3. The relays 2 in the second row from the left are accommodated in the case 4 such that the protruding direction of the locking projections forming the first locking portions 23, 23 is along the longitudinal direction D2.

The block 3 includes a mating terminal 31 to be connected to the terminal 22, and a block main body 32 that accommodates the mating terminal 31. The mating terminal 31 includes a plate-shaped substrate portion 311, an electric contact portion 312 connected to the terminal 22, and an electric wire coupling portion 313 connected to an electric wire (not shown). The electric contact portion 312 includes a pair of spring pieces 314, 314 that are to be elastically brought into contact with the terminal 22. The pair of spring pieces 314, 314 are erected from both sides in a width direction of the substrate portion 311, and are bent such that tips thereof approach the substrate portion 311.

The electric wire coupling portion 313 includes a pair of crimping pieces 315, 315 to crimp the electric wire. The pair of crimping pieces 315, 315 are erected from both sides in the width direction of the substrate portion 311. The pair of crimping pieces 315, 315 are bent such that tip ends thereof approach the substrate portion 311 in a state where the electric wire (not shown) is mounted on the substrate portion 311. The mating terminal 31 is electrically connected to the electric wire by sandwiching the electric wire between the tip ends of the crimping pieces 315, 315 and the substrate portion 311.

The block main body 32 is provided with a plurality of terminal housing chambers 321 that accommodate the mating terminals 31 and run along the upper-lower direction D1, a lance 322 (see FIG. 3) that locks the mating terminals 31, and a second locking portion 323 that is to be engaged with the case 4. As shown in FIG. 3, the lance 322 includes a locking arm 324 that protrudes upward from an inner surface of the terminal housing chamber 321 and is provided to be flexible in a direction in which the upper end portion comes into contact with and is separated from the inner surface of the terminal housing chamber 321, and a locking projection 325 that is provided slightly below the upper end of the locking arm 324 and is to lock the lower end of the spring piece 314.

As shown in FIG. 3, the second locking portion 323 includes a locking arm 326 that protrudes downward from the outer surface of the block main body 32 and is provided so as to be flexible in a direction in which the lower end portion comes into contact with and is separated from the outer side surface of the block main body 32, and a locking projection 327 that is provided slightly above the lower end of the locking arm 326 and is to be engaged with the case 4.

The second locking portions 323 are respectively provided on a pair of outer side surfaces of the block main body 32 that face each other. The pair of second locking portions 323, 323 are provided at positions shifted from each other in a direction D5 orthogonal to both a facing direction D4 along which the outer side surfaces of the block main body 32 face each other and the upper-lower direction D1.

In the present embodiment, the block 3 in the leftmost row in FIG. 1 is accommodated in the case 4 such that the facing direction D4 is along the lateral direction D3. The blocks 3 in the second row from the left are accommodated in the case 4 such that the facing direction D4 is along the longitudinal direction D2.

As shown in FIG. 1, the case 4 includes a frame 41 that accommodates the relay 2 and the block 3, an upper cover (not shown) that closes an upper end opening portion of the frame 41, and a lower cover 42 that closes a lower end opening portion of the frame 41.

The frame 41 is provided in a substantially rectangular cylindrical shape. In the frame 41, the relays 2 and the blocks 3 are arranged in a matrix form along the longitudinal direction D2 and the lateral direction D3.

As shown in FIGS. 4 and 5, the frame 41 includes a substantially rectangular cylindrical frame main body 411 (FIG. 1), a plurality of frame portions 412A to 412C that partition a space inside the frame main body 411 and surround the block 3 along the upper-lower direction D1 (protruding direction), and frame portions 413A to 413C that surround the relay main body 21 along the upper-lower direction D1. As shown in FIGS. 4 and 5, the frame portions 412A to 412C are provided in a substantially rectangular cylindrical shape having openings in the upper-lower direction D1, and each of the frame portions 412A to 412C includes peripheral walls 414, 415 facing each other along the longitudinal direction D2, and peripheral walls 416, 417 provided between the peripheral walls 414 and 415 and facing each other along the lateral direction D3. The peripheral walls 416, 417 of the frame portions 412B and 412C are shared and formed as one peripheral wall. The frame portions 413A to 413C are erected from upper end surfaces of the frame portions 412A to 412C in the upper-lower direction D1, and include an L-shaped wall 418 and the like that surrounds a corner portion of the relay main body 21.

The frame 41 is provided with a third locking portion 419 to be engaged with the first locking portion 23 of the relay 2 and a fourth locking portion 420 to be engaged with the second locking portion 323 of the block 3. The fourth locking portion 420 protrudes from the inner side surface of the frame portions 412A to 412C. Specifically, in the leftmost frame portion 412A, the fourth locking portion 420 is provided on the inner side surfaces of the pair of peripheral walls 414, 415 facing each other along the longitudinal direction D2. In the frame portion 412B in the second row from the left, the fourth locking portion 420 is provided on the inner surface of the peripheral wall 416, and in the frame portion 413C, the fourth locking portion 420 is provided on the inner surface of the peripheral wall 417. The fourth locking portion 420 includes a locking projection whose projection amount decreases toward the lower side in the upper-lower direction D1.

Accordingly, when the block 3 is inserted from the lower opening of the frame portions 412A to 412C, the locking projection forming the fourth locking portion 420 bends the locking arm 326 of the block 3. When the block 3 is inserted until the locking projection forming the fourth locking portion 420 gets over the locking projection 327 of the block 3, the locking arm 326 is restored, and the locking projection 327 of the block 3 and the locking projection forming the fourth locking portion 420 of the frame portions 412A to 412C are engaged with each other.

The third locking portion 419 protrudes from an upper end surface of the frame portions 412A to 412C in the upper-lower direction D1. As shown in FIG. 4, the third locking portion 419 includes a substantially rectangular base portion 419A supported at end surfaces of the frame portions 412A to 412C in the upper-lower direction D1, a pair of locking arms 419B, 419B protruding upward in the upper-lower direction D1 from the base portion 419A, a locking coupling portion 419C that connects the pair of locking arms 419B, 419B, and an enclosing wall 419D erected from a peripheral edge of the base portion 419A.

The base portion 419A supported at upper end surfaces of the peripheral walls 416 and 417 in the upper-lower direction D1 is formed in an elongated shape along the longitudinal direction D2. The base portion 419A supported at upper end surfaces of the peripheral walls 414, 415 in the upper-lower direction D1 is formed in an elongated shape along the lateral direction D3. The pair of locking arms 419B are provided side by side along a longitudinal direction of the base portion 419A. The enclosing wall 419D is provided with openings opened toward a side of a center of corresponding one of the frame portions 412A to 412C.

Accordingly, when the terminal 22 of the relay 2 is brought toward the mating terminal 31 of the block 3 from the upper side in the upper-lower direction D1, the first locking portion 23 (locking projection) of the relay 2 abuts on the locking coupling portion 419C and bends the pair of locking arms 419B, 419B. When the relay 2 is brought close to the block 3 until the first locking portion 23 is located on the lower side of the locking coupling portion 419C, the pair of locking arms 419B, 419B are restored and the locking coupling portion 419C and the first locking portion 23 get engaged with each other. In addition, the terminal 22 of the relay 2 and the mating terminal 31 accommodated in the block 3 get connected to each other at a position where the locking coupling portion 419C and the first locking portion 23 are engaged with each other.

According to the embodiment described above, the relay main body 21 of the relay 2 is provided with the first locking portion 23 to be engaged with the case 4, the block 3 is provided with the second locking portion 323 to be engaged with the case 4, and the case 4 is provided with the third locking portion 419 to be engaged with the first locking portion 23 and the fourth locking portion 420 to be engaged with the second locking portion 323. Accordingly, it is possible to increase the fixing strength of the relay 2 while it is still possible to use the existing blocks 3 in which the locking portion that locks the relay main body 21 is not provided.

Further, when the block 3 is provided with the fourth locking portion 420 to be engaged with the relay main body 21 as in related art, the fourth locking portion 420 needs to be provided on the inner side of the frame portions 412A to 412C, and a necessary space has to be large. On the other hand, in the present embodiment, since the fourth locking portion 420 is provided to be erected from the frame portions 412A to 412C, space can be saved.

As products to be distributed in market, for example, the case 4 may be formed of polypropylene (PP), and the block main body 32 may be formed of PPE-PA 66. That is, the frame 41 is formed of a material that is less expensive and lighter than the block main body 32. Therefore, by providing the frame 41 with the fourth locking portion 420, it is possible to achieve cost reduction and weight reduction. The frame 41 is formed of a material having a rigidity lower than that of the block main body 32. Therefore, it is possible to reduce the insertion force required when the relay 2 is attached.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

For example, the electronic component is not limited to a relay, and may be a fuse or the like.

In addition, shapes of the first to fourth locking portions 23, 323, 419, and 420 are not limited to the embodiment described above, and may be other known locking shapes.

According to an aspect of the embodiments described above, an electrical junction box (1) includes an electronic component (2) including a component main body (21) and a terminal (22) protruding from the component main body (21), a block (3) including a mating terminal (31) configured to be connected to the terminal (22) and a block main body (32) configured to accommodate the mating terminal (31) and a case (4) having a box shape and configured to accommodate the electronic component (2) and the block (3). The component main body (21) of the electronic component (2) is provided with a first locking portion (23). The block (3) is provided with a second locking portion (323). The case (4) is provided with a third locking portion (419) configured to be engaged with the first locking portion (23) and a fourth locking portion (420) configured to be engaged with the second locking portion (323).

According to the electrical junction box having the above configuration, the component main body of the electronic component is engaged with the case. Accordingly, it is possible to increase the fixing strength of the electronic component while using an existing block in which the locking portion to lock the component main body is not provided.

The case (4) may be provided with a frame portion (412A to 412C) configured to surround the block (3) along a protruding direction (D1) in which the terminal (22) protrudes from the component main body (21). The third locking portion (419) may protrude from an end surface of the frame portion (412A to 412C), the end surface being on a side opposite to the protruding direction (D1).

With this configuration, the third locking portion is provided so as to be erected from the frame portion. As a result, space saving can be achieved.

What is claimed is:

1. An electrical junction box comprising:
   an electronic component including a component main body and a main terminal protruding from the component main body;
   a block including a mating terminal configured to be connected to the main terminal and a block main body configured to accommodate the mating terminal; and
   a case having a box shape and configured to accommodate the electronic component and the block,
   wherein the component main body of the electronic component is provided with a first locking portion,
   wherein the block is provided with a second locking portion,
   wherein the case is provided with a third locking portion and a fourth locking portion, and
   wherein the third locking portion is configured to be engaged with the first locking portion and the fourth locking portion is configured to be engaged with the second locking portion.

2. The electrical junction box according to claim 1,
   wherein the case is provided with a frame portion configured to surround the block along a protruding direction in which the main terminal protrudes from the component main body, and
   wherein the third locking portion protrudes from an end surface of the frame portion, the end surface being on a side opposite to the protruding direction.

3. The electrical junction box according to claim 1, wherein the electronic component includes a relay or a fuse.

4. The electrical junction box according to claim 1, wherein there are a plurality of electronic components that are accommodated in the case.

\* \* \* \* \*